(12) United States Patent
Block et al.

(10) Patent No.: US 7,028,157 B2
(45) Date of Patent: Apr. 11, 2006

(54) ON-DEMAND ALLOCATION OF DATA STRUCTURES TO PARTITIONS

(75) Inventors: Timothy Roy Block, Rochester, MN (US); Shawn Michael Lambeth, Pine Island, MN (US); Thomas Rembert Sand, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 10/422,680

(22) Filed: Apr. 24, 2003

(65) Prior Publication Data

US 2004/0215915 A1   Oct. 28, 2004

(51) Int. Cl.
*G06F 12/00* (2006.01)

(52) U.S. Cl. ............ 711/173; 711/170; 711/171; 711/172; 718/100; 718/104

(58) Field of Classification Search ........ 711/170–173; 718/100, 104
See application file for complete search history.

(56) References Cited

U.S. PATENT DOCUMENTS

| | | | |
|---|---|---|---|
| 6,279,046 B1 * | 8/2001 | Armstrong et al. | 710/5 |
| 6,587,938 B1 * | 7/2003 | Eilert et al. | 712/29 |
| 6,691,146 B1 * | 2/2004 | Armstrong et al. | 718/100 |
| 2003/0212873 A1 * | 11/2003 | Lee et al. | 711/170 |
| 2003/0212883 A1 * | 11/2003 | Lee et al. | 713/1 |
| 2003/0212884 A1 * | 11/2003 | Lee et al. | 713/1 |
| 2004/0194096 A1 * | 9/2004 | Armstrong et al. | 718/100 |

* cited by examiner

*Primary Examiner*—Donald Sparks
*Assistant Examiner*—Bao Q. Truong
(74) *Attorney, Agent, or Firm*—Owen J. Gamon (57) ABSTRACT

A method, apparatus, system, and signal-bearing medium that in an embodiment dynamically allocate and/or deallocate data structures on demand to respective partitions in a logically-partitioned electronic device. The data structures are associated with an adapter, and the partitions may use the data structures to access the adapter and, in an embodiment, to send and/or receive messages across a network.

19 Claims, 8 Drawing Sheets

ON-DEMAND ALLOCATION OF DATA STRUCTURES TO PARTITIONS

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

An embodiment of the invention generally relates to computers. In particular, an embodiment of the invention generally relates to the dynamic allocation of data structures to logical partitions in a logically-partitioned computer.

BACKGROUND

Computer technology continues to advance at a rapid pace, with significant developments being made in both software and in the underlying hardware upon which the software executes. One significant advance in computer technology is the development of multi-processor computers, where multiple computer processors are interfaced with one another to permit multiple operations to be performed concurrently, thus improving the overall performance of such computers. Also, a number of multi-processor computer designs rely on logical partitioning to allocate computer resources to further enhance the performance of multiple concurrent operating systems.

With logical partitioning, a single physical computer is permitted to operate essentially like multiple and independent virtual computers (referred to as logical partitions), with the various resources in the physical computer (e.g., processors, memory, data structures, and input/output devices) allocated among the various logical partitions. Each logical partition may execute a separate operating system, and from the perspective of users and of the software applications executing on the logical partition, operates as a fully independent computer.

Logical partitions may desire to communicate with each other via messages. A logical partition may communicate not only to another logical partition operating on the same computer, but also to another logical partition operating on a different computer connected via a network. In order to send and receive messages across a network, a logical partition makes use of an adapter, which allows a connection to the network via a channel or channels.

In order to manage the adapter and its channels, a logical partition uses data structures, which represent the adapter and its channels and contain configuration and status information. Before the advent of logically-partitioned computers, managing the data structures associated with the adapter was relatively straightforward because the computer only had one operating system accessing the data structures, and the number of adapters was small. But now, an environment in which many logical partitions with many operating systems accessing many adapters can exist on a single computer. Further, logical partitions may be created and destroyed, and adapters may be installed and uninstalled, which causes additional complexity in managing the data structures.

Despite this additional complexity, today's logically-partitioned computers still use the same technique for managing data structures that the old single-operating system computers used: a large global array holds all the data for the channels for a given adapter, and this global array is accessible by all related management code regardless of the partition that is accessing a given channel. A large global array increases the complexity of code development and maintenance for support of multiple logical partitions, thus adversely affecting the reliability of the desired code. Also, this global array requires a large amount of dedicated memory, which is expensive.

Without a better way of allocating data structures for network adapters, logically-partitioned systems will continue to suffer from the high cost of large amounts of memory. Although the aforementioned problems have been discussed in the context of a network adapter, they may occur with any type of adapter.

SUMMARY

A method, apparatus, system, and signal-bearing medium are provided that in an embodiment dynamically allocate and/or deallocate data structures on demand to respective partitions in a logically-partitioned electronic device. The data structures are associated with an adapter, and the partitions may use the data structures to access the adapter and, in an embodiment, to send and/or receive messages across a network.

DETAILED DESCRIPTION

Figure 1:
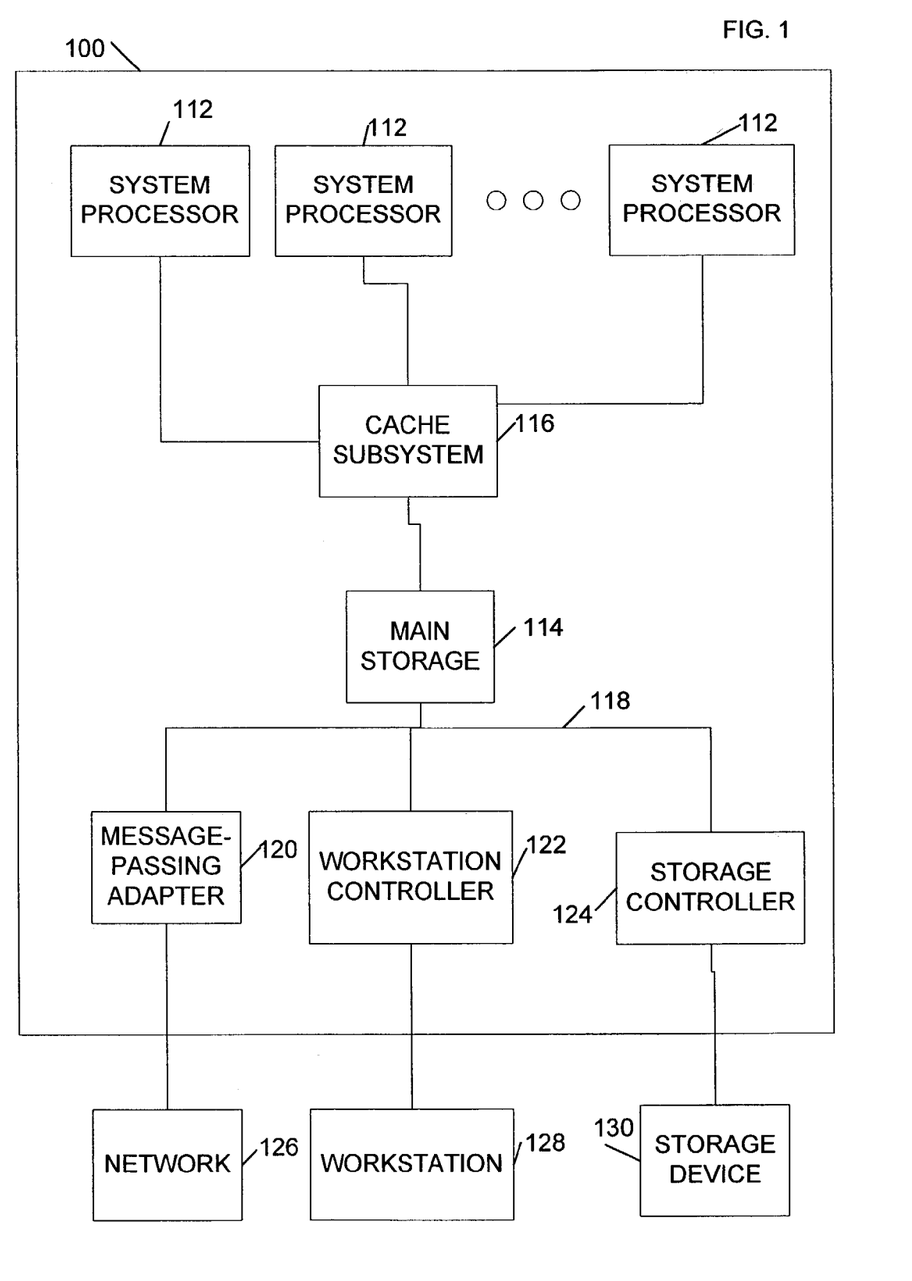
FIG. 1 depicts a block diagram of an example electronic device for implementing an embodiment of the invention.

Turning to the drawings, wherein like numbers denote like parts throughout the several views, FIG. 1 illustrates a data processing apparatus or electronic device 100 consistent with an embodiment of the invention. The electronic device 100 generically represents, for example, any of a number of multi-user computer systems such as a network server, a midrange computer, or a mainframe computer. But, embodiments of the invention may be implemented in other data processing apparatus, e.g., in stand-alone or single-user computer systems such as workstations, desktop computers, portable computers, pocket computers, tablet computers, or in other devices that have an embedded computing device, such as an embedded controller in a teleconferencing system, appliance, pager, telephone, automobile, PDA (Personal Digital Assistant), or any other appropriate device. One suitable implementation of an embodiment of the electronic device 100 is in a midrange computer such as the eServer pSeries computer available from International Business Machines Corporation.

The electronic device 100 generally includes one or more system processors 112 coupled to a memory subsystem including a main storage 114, e.g., an array of dynamic random access memory (DRAM), but in other embodiments any appropriate main storage may be used. Also illustrated as interposed between the processors 112 and the main storage 114 is a cache subsystem 16, typically including one or more levels of data, instruction and/or combination caches, with certain caches either serving individual processors or multiple processors. Furthermore, the main storage 114 is coupled to a number of types of external (I/O) devices via a system bus 118 and a plurality of interface devices, e.g., a message-passing adapter 120, a workstation controller 122, and a storage controller 124, which respectively provide external access to one or more external networks 126, one or more workstations 128, and/or one or more storage devices 130.

The processors 112 represent central processing units of any type of architecture, such as a CISC (Complex Instruction Set Computing), RISC (Reduced Instruction Set Computing), VLIW (Very Long Instruction Word), or a hybrid architecture, although any appropriate processor may be used. In various embodiments, the processors 112 may be of all the same type or some or all may be of different types. The processors 112 execute instructions and typically include control units that organize data and program storage in memory and transfer data and other information between the various parts of the electronic device 100.

The system bus 118 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The message-passing adapter 120 interfaces directly or indirectly to the network 126 and serves to pass messages between the electronic device 100 and the network 126. In various embodiments the message-passing adapter 120 may be a hardware device or a combination of hardware and software. Although FIG. 1 illustrates a message-passing adapter 120, in other embodiments any appropriate type of adapter may be used.

The network 126 may be any suitable network or combination of networks and may support any appropriate protocol suitable for communication of data and/or code including messages to/from the electronic device 100. In various embodiments, the network 126 may represent a storage device or a combination of storage devices, either connected directly or indirectly to the electronic device 100. In an embodiment, the network 126 may support Infiniband. In another embodiment, the network 126 may support wireless communications. In another embodiment, the network 126 may support hard-wired communications, such as a telephone line or cable. In another embodiment, the network 126 may support the Ethernet IEEE (Institute of Electrical and Electronics Engineers) 802.3x specification. In another embodiment, the network 126 may be the Internet and may support IP (Internet Protocol). In another embodiment, the network 126 may be a local area network (LAN) or a wide area network (WAN). In another embodiment, the network 126 may be a hotspot service provider network. In another embodiment, the network 126 may be an intranet. In another embodiment, the network 126 may be a GPRS (General Packet Radio Service) network. In another embodiment, the network 126 may be any appropriate cellular data network or cell-based radio network technology. In another embodiment, the network 126 may be an IEEE 802.11B wireless network. In still another embodiment, the network 126 may be any suitable network or combination of networks. Although one network 126 is shown, in other embodiments any number of networks (of the same or different types) may be present, including zero.

The storage device 130 represents one or more mechanisms for storing data. For example, the storage device 130 may include read only memory (ROM), random access memory (RAM), magnetic disk storage media, optical storage media, flash memory devices, and/or other machine-readable media. In other embodiments, any appropriate type of storage device may be used. Although only one storage device 130 is shown, multiple storage devices and multiple types of storage devices may be present. Although the storage device 130 is shown to be connected to the storage controller 124, in other embodiments, the storage device 130 may be accessed via the network 126. Although the storage device 130 is shown to be external to the electronic device 100, in another embodiment, the storage device 130 may be internal to the electronic device 100.

The hardware and software depicted in FIG. 1 may vary for specific applications and may include more or fewer elements than those depicted and may be arranged differently than depicted. For example, other peripheral devices such as audio adapters, or chip programming devices, such as EPROM (Erasable Programmable Read-Only Memory) programming devices may be used in addition to or in place of the hardware already depicted.

Figure 2:
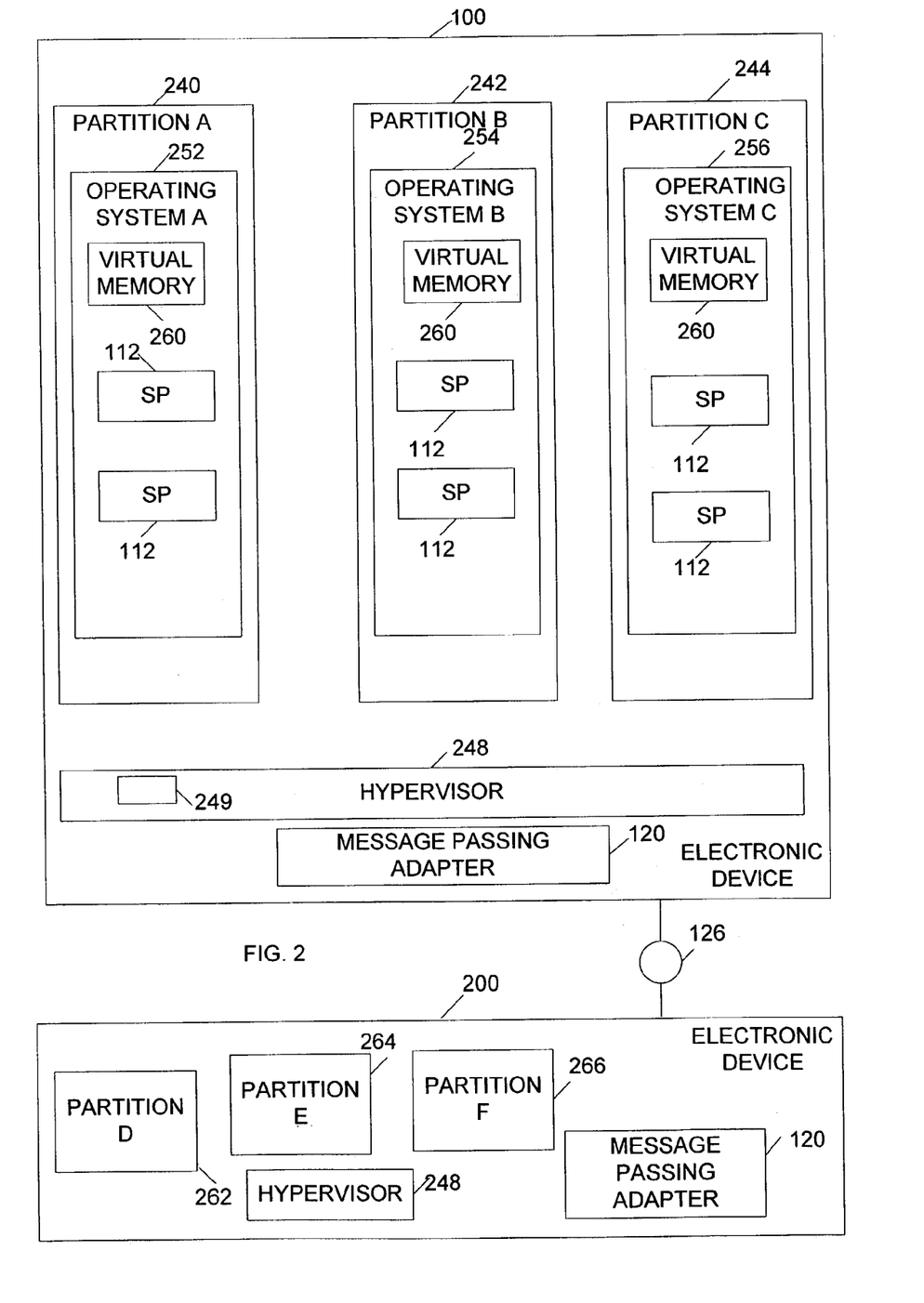
FIG. 2 depicts a block diagram of the primary hardware and software components and resources of an embodiment of the invention.

FIG. 2 illustrates in greater detail the primary software and hardware components and resources utilized in implementing a logically-partitioned computing environment on the electronic device 100, including a plurality of logical partitions 240, 242, and 244 managed by a hypervisor 248, according to an embodiment of the invention. All or only a portion of the logical partitions 240, 242, and 244 and the hypervisor 248 may at various times exist in the main storage 114, the cache subsystem 116, and/or the storage device 130 and in various embodiments may be transmitted and/or received across the network 126, as previously shown in FIG. 1.

Each logical partition 240, 242, and 244 utilizes an operating system (e.g., operating systems 252, 254, and 256 for the logical partitions 240, 242, and 244, respectively), which controls the primary operations of the logical partition in much the same manner as the operating system of a non-partitioned computer. For example, each operating system 252, 254, and 256 may be implemented using the AIX operating system available from International Business Machines Corporation, residing on top of a kernel, e.g., a Run-Time Abstraction Service (RTAS) in each partition along with a Converged PowerPC Hypervisor (PHYP) shared across all partitions. In various embodiments, the operating systems 252, 254, and 256 may be the same or some or all of them may be different.

Each logical partition 240, 242, and 244 executes in a separate, or independent, memory space, represented by virtual memory 260. Moreover, each logical partition 240, 242, and 244 is statically and/or dynamically allocated a portion of the available resources in the electronic device 100. For example, each logical partition is allocated one or more processors 112, as well as a portion of the available memory space for use in the virtual memory 260. In an embodiment, the logical partitions 240, 242, and 244 may share specific hardware resources such as processors, such that a given processor is utilized by more than one logical partition. In another embodiment, the hardware resources can be allocated to only one logical partition at a time. Although three logical partitions 240, 242, and 244 are shown in FIG. 2, other embodiments may support any number of logical partitions.

The hypervisor 248 is a partition manager, which is a resource shared among the logical partitions. The hypervisor 248 manages the logical partitions and facilitates the allocation of resources among the different logical partitions. The hypervisor 248 dynamically allocates data structures 249 on demand when requested, which allow the partitions 240, 242, and 244 to access the message-passing adapter 120. The hypervisor 248 organizes the data structures 249 based on a number of installed adapters, a number of participating partitions and by type and attributes of the channels provided by the message-passing adapter 120. The data structures 249 may also contain executable or interpretable code. The data structures 249 are further described below with reference to FIG. 3. The hypervisor 248 groups and manages channels using a set of virtual adapters, one assigned to each partition wishing to use the resources of a given adapter. The hypervisor 248 allocates both dedicated and shared-on-demand channels amongst the logical partitions depending on the channel type. The hypervisor 248 includes instructions capable of being executed on the processors 112 or statements capable of being interpreted by instructions executing on the processors 112 to carry out the functions as further described below with reference to FIGS. 4, 5, 6, 7, and 8.

Additional resources, e.g., mass storage, backup storage, user input, network connections, and the like, are typically allocated to one or more logical partitions by the hypervisor 248. Resources can be allocated in a number of manners, e.g., on a bus-by-bus basis, or on a resource-by-resource basis, with multiple logical partitions sharing resources on the same bus. Some resources may even be allocated to multiple logical partitions at a time.

The network 126 is also connected to an electronic device 200, which includes partitions 262, 264, and 266 analogous to the partitions 240, 242, and 244 already described above for the electronic device 100. The electronic device 200 also includes an instance of the hypervisor 248 and the message-passing adapter 120. The various partitions in the electronic devices 100 and 200 may send and receive messages to each other via the message-passing adapters 120 and the network 126. The electronic device 200 may also include other elements not necessary for an understanding of an embodiment of the invention.

The various software components and resources illustrated in FIG. 2 and implementing the embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic devices 100 and 200, and that, when read and executed by one or more processors in the electronic devices 100 and 200, cause the electronic device to perform the steps necessary to execute steps or elements embodying the various aspects of an embodiment of the invention. Moreover, while embodiments of the invention have and hereinafter will be described in the context of fully functioning electronic devices, the various embodiments of the invention are capable of being distributed as a program product in a variety of forms, and that the invention applies equally regardless of the particular type of signal-bearing medium used to actually carry out the distribution. Examples of signal-bearing media include but are not limited to recordable-type media such as volatile and non-volatile memory devices, floppy and other removable disks, hard disk drives, magnetic tape, optical disks (e.g., CD-ROM's, DVD's, etc.), among others, and transmission-type media such as digital and analog communication links, including wireless communication links.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIGS. 1 and 2 are not intended to limit the present invention. Indeed, other alternative hardware and/or software environments may be used without departing from the scope of the invention.

Figure 3:
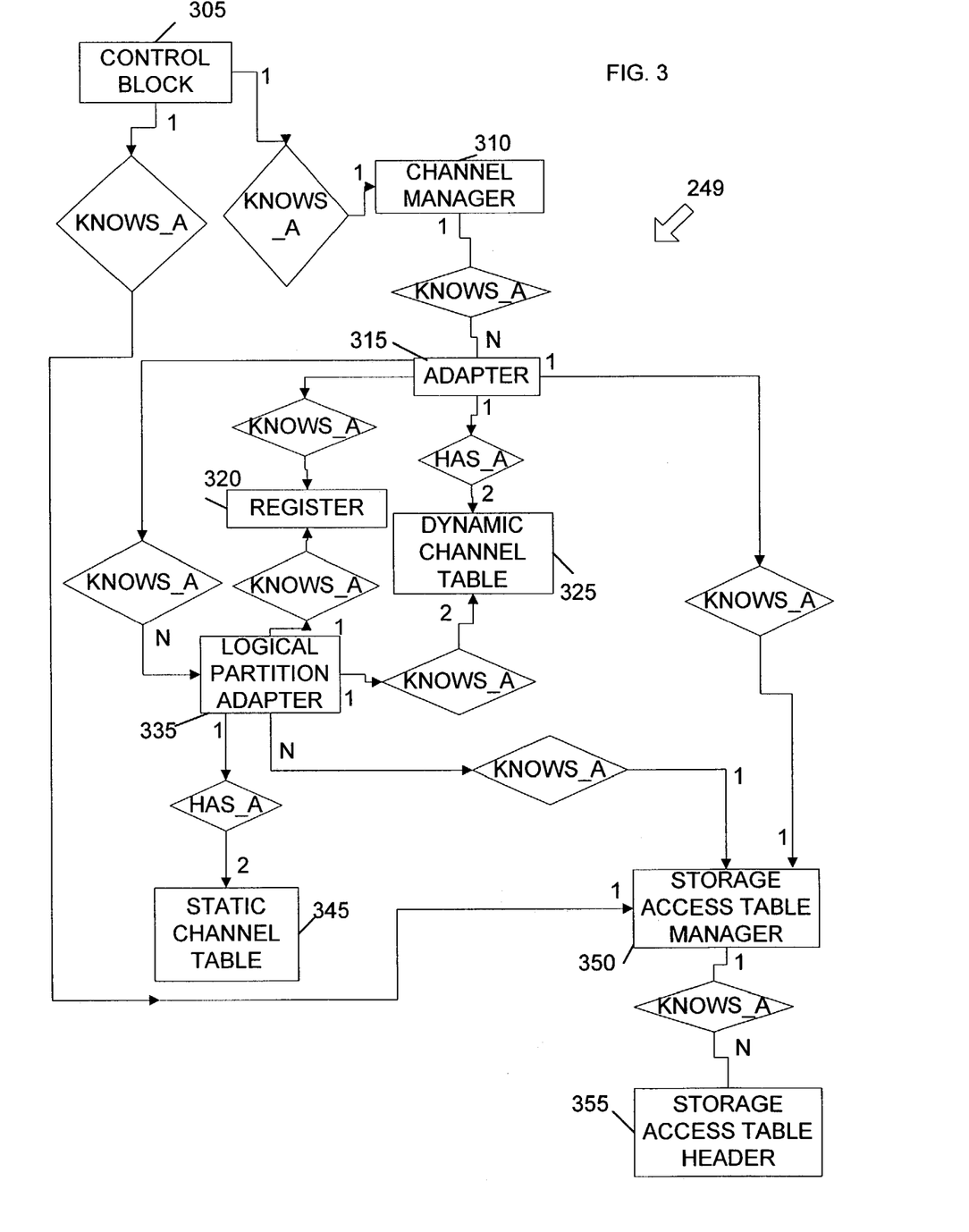
FIG. 3 depicts a class diagram of the components of a hypervisor, according to an embodiment of the invention.

FIG. 3 depicts a class diagram representing the components 249 of the hypervisor 248 (FIG. 2), according to an embodiment of the invention. Illustrated in FIG. 3 are a control block 305, a channel manager 310, an adapter 315, a register 320, a dynamic channel table 325, a logical-partition adapter 335, a static channel table 345, a storage access table manager 350, and a storage access table header 355.

An instantiation of the control block 305 is an anchor data structure that allows the hypervisor 248 to find the channel manager 310. The control block 305 has a "knows_a" relationship with the channel manager 310 and a "knows_a" relationship with the storage access table manager 350.

An instantiation of the channel manager 310 includes instructions capable of being executed on the processor 112 or statements capable of being interpreted by instructions that execute on the processor 112 to carry out the functions as further described below with reference to FIGS. 4, 5, 6, 7, and 8. The channel manager 310 has a "knows_a" relationship with the adapter 315. The channel manager 310 provides an interface for the partitions that request channel resources. The logical partitions request channel resources using a token that identifies the adapter that they wish to use. In an embodiment, the token may be a logical I/O (Input/Output) bus number, although in other embodiments any appropriate token may be used.

An instantiation of the adapter 315 represents the message-passing adapter 120 (FIGS. 1 and 2) and includes configuration information for the message-passing adapter 120. In an embodiment one adapter object exists for each message-passing adapter 120. The adapter 315 has a "knows_a" relationship with the register 320, has a "has_a" relationship with the dynamic channel table 325, and has a "knows_a" relationship with the storage access table manager 350.

An instantiation of the register 320 includes status information and associated control logic for the message-passing adapter 120. In an embodiment, the register 320 represents the physical message-passing adapter 120, although in other embodiments any appropriate adapter may be used.

Instantiations of the dynamic channel table 325 support dynamic pools from which the partitions may allocate and free channel resources via the hypervisor 248, the channel manager 310, and the adapter 315. In an embodiment, the channel manager 310 may group channels with common attributes by class. A parent channel class carries all globally common functions and attributes, and child classes are derived from the parent, which picks up various unique group attributes, such as the ability to be pooled and used dynamically. In this example, "dynamic" in the dynamic channel table 325 is an example of an adapter-level pooled channel.

An instantiation of the logical-partition adapter 335 exists for each logical partition that desires to use the associated message-passing adapter 120, such as the partitions 240, 242, 244, 262, 264, or 266. The logical partition associated with the logical-partition adapter data structure 335 may access the adapter 120 via the logical-partition adapter data structure 335 and may use the adapter 120, for example to send and/or receive messages across the network 126. The logical-partition adapter 335 has a "knows_a" relationship with the register 320, a "knows_a" relationship with the dynamic channel table 325, a "knows_a" relationship with the storage access table manager 350, and a "has_a" relationship with the static channel table 345.

An instantiation of the static channel table 345 represents channels that the hypervisor 248 assigns statically to a partition. The storage access table manager 350 has a "knows_a" relationship with the storage access table header 355.

In an embodiment, the storage access table manager 350 supports the allocation and freeing of the storage access table headers 355 on an adapter 315 basis. The storage access table manager 350 also provides functional methods for accessing the storage access table headers 355 during use of a channel by a partition 240, 242, 244, 262, 264, or 266. The instantiations of the storage access table headers 355 provide, on a per-channel basis, for control of access/authorization mechanisms relative to storage used by the physical channels of the message-passing adapter 120 during transfer of messages.

In an embodiment, channels represent connections into the network 126. Channels may have a variety of distinct attributes. Channel management is performed by channel type where the type represents one of the aforementioned distinct attributes. Each channel type is represented by a distinct channel table structure. Multiple instances of each distinct channel table structure may be instantiated.

An embodiment defines static and dynamic channels with corresponding static 345 and dynamic 325 channel tables. Static channels are reserved for and associated with specific instances of the logical-partition adapters 335. In an embodiment, the first instance of the logical-partition adapter 335 is assigned a specific channel number range with associated channel resources guaranteed to be available irrespective of other partition activity. The static channel tables 345 include mappings between static channel numbers and tokens representing links to the appropriate storage access table headers 355.

Dynamic channels are made available as pools of channels that may be reserved and freed dynamically as necessary by any logical partition using a subject logical partition adapter 335. The dynamic channel tables 325 include mappings between a range of dynamic channel numbers, partition identification numbers, and tokens representing links to the appropriate storage access table headers 355. Multiple instances of channel tables may be created to allow suballocations of channels within a static or dynamic channel type.

Although FIG. 3 illustrates a class diagram, for convenience of exposition, references to the elements shown in FIG. 3 may actually refer to objects instantiated from the classes. Although an embodiment of the invention is described using object-oriented programming terminology, other embodiments of the invention may use procedural programming or any other appropriate type of programming.

Figure 4:
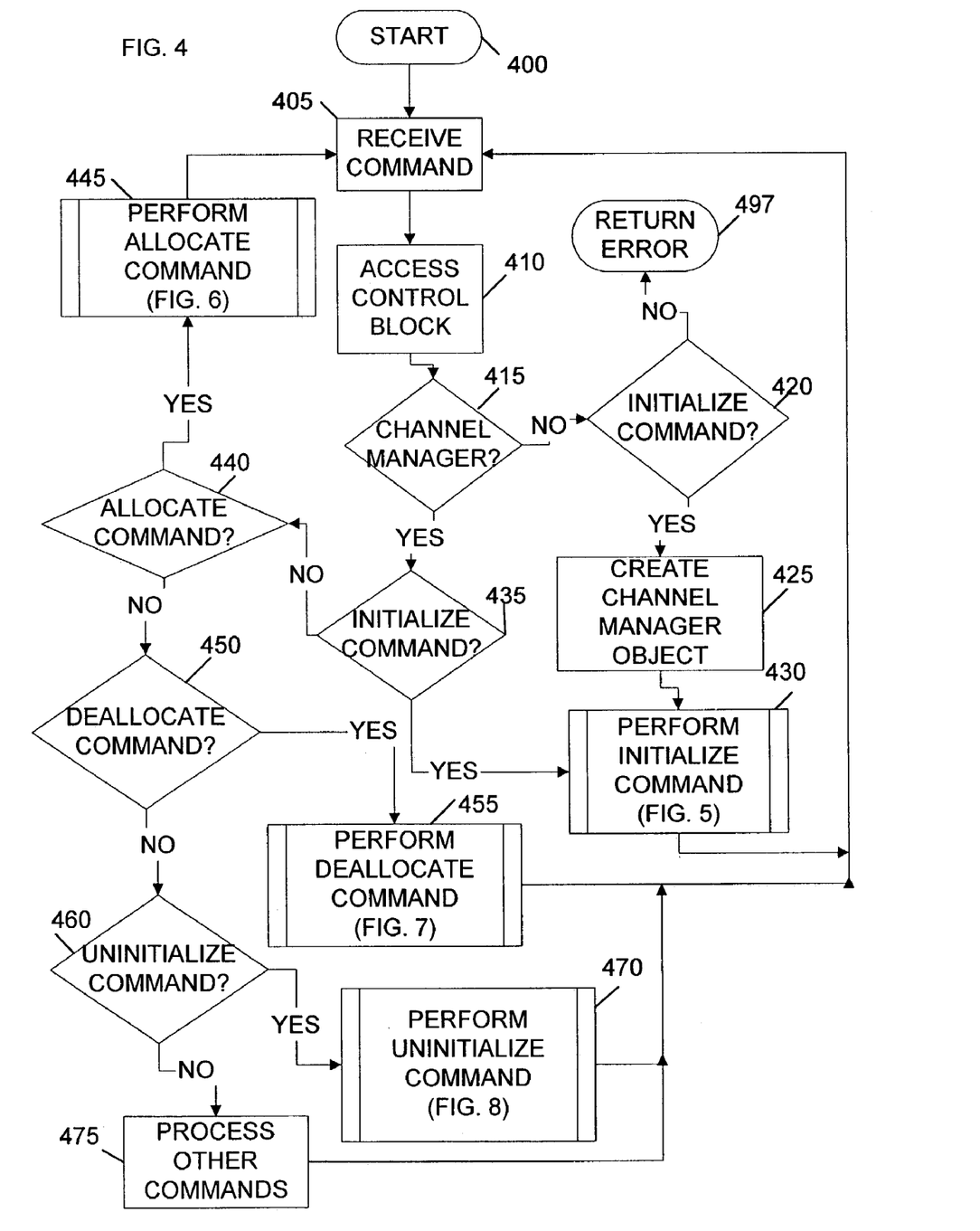
FIG. 4 depicts a flowchart of example processing for commands received by a hypervisor, according to an embodiment of the invention.

FIG. 4 depicts a flowchart of example processing for commands received by the hypervisor 248 (FIG. 2), according to an embodiment of the invention. Control begins at block 400. Control then continues to block 405 where the hypervisor 248 receives a command from a logical partition. Control then continues to block 410 where the hypervisor 248 accesses the control block 305. Control then continues to block 415 where the hypervisor 248 determines whether the channel manager 310 exists. If the determination at block 415 is false, then control continues to block 420 where the hypervisor 248 determines whether the command previously received at block 405 is an initialize command. If the determination at block 420 is false, then control continues to block 497 where the hypervisor 248 returns an error to the invoking partition.

If the determination at block 420 is true, then control continues to block 425 where the hypervisor 248 creates the channel manager object 310. Control then continues to block 430 where the hypervisor 248 calls the channel manager 310 to perform the initialize command, as further described below with reference to FIG. 5. Control then returns to block 405, as previously described above.

If the determination at block 415 is true, then a channel manager exists, so control continues from block 415 to block 435 where the hypervisor 248 determines whether the command previously received at block 405 is an initialize command. If the determination at block 435 is true, then control continues to block 430, as previously described above.

If the determination at block 435 is false, then control continues to block 440 where the hypervisor 248 determines whether the command previously received at block 405 is an allocate command. If the determination at block 440 is true, then control continues to block 445 where the hypervisor 248 calls the channel manager 310 to perform the allocate command as further described below with reference to FIG. 6. Control then returns to block 405, as previously described above.

If the determination at block 440 is false, then control continues to block 450 where the hypervisor 248 determines whether the command previously received at block 405 is a deallocate command. If the determination at block 450 is true, then control continues to block 455 where the hypervisor 248 calls the channel manager 310 to perform the deallocate command as further described below with reference to FIG. 7. Control then returns to block 405, as previously described above.

If the determination at block 450 is false, then control continues to block 460 where the hypervisor 248 determines whether the command previously received at block 405 is an uninitialize command. If the determination at block 460 is true, then control continues to block 470 where the hypervisor 248 calls the channel manager 310 to perform the uninitialize command as further described below with reference to FIG. 8. Control then returns to block 405, as previously described above.

If the determination at block 460 is false, then control continues to block 475 where the hypervisor 248 processes other commands. Control then returns to block 405, as previously described above.

Figure 5:
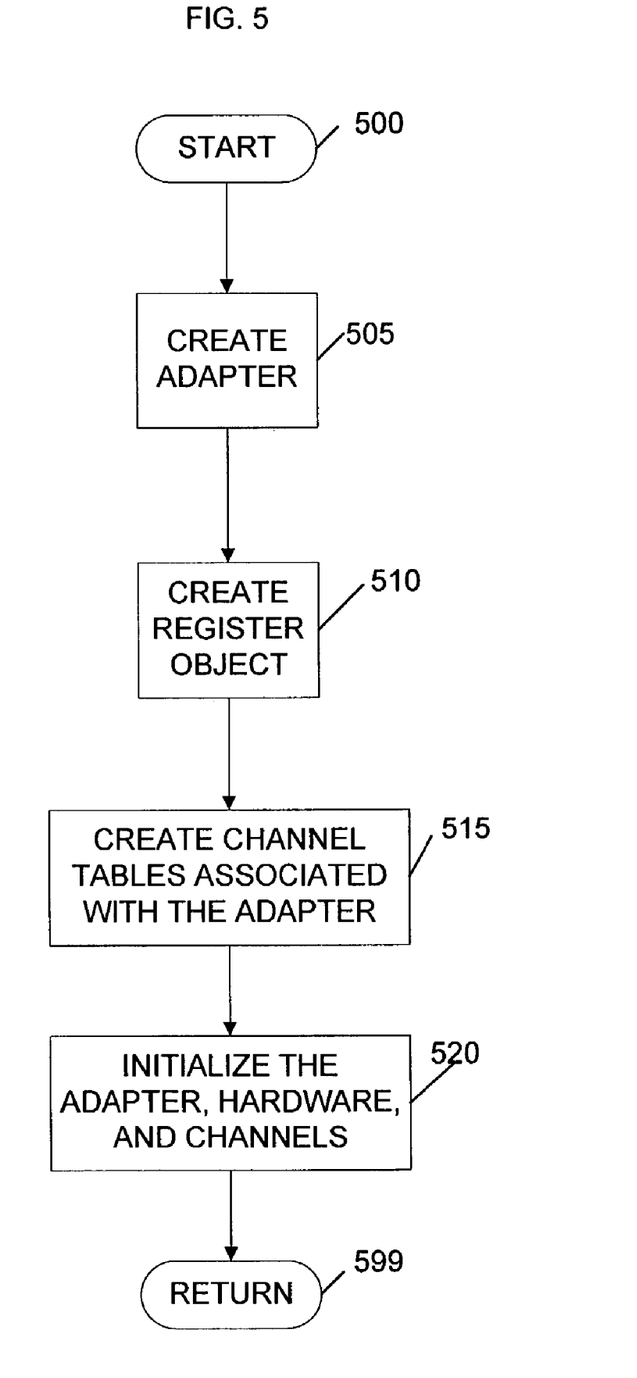
FIG. 5 depicts a flowchart of example processing for a channel manager function to initialize an adapter, according to an embodiment of the invention.

FIG. 5 depicts a flowchart of example processing for a function in the channel manager function 310 to initialize an adapter 315, according to an embodiment of the invention. The processing of FIG. 5 may be invoked, for example, during a power on or IPL (Initial Program Load) of the electronic device 100 or 200 or when an additional message-passing adapter 120 is added to the electronic device 100 or 200.

Control begins at block 500. Control then continues to block 505 where the channel manager 310 creates an adapter object 315, which represents the message-passing adapter 120 and includes configuration information for the message-passing adapter 120. Control then continues to block 510 where the channel manager 310 creates a register object 320. Control then continues to block 515 where the channel manager 310 creates channel tables associated with the adapter object 315, such as the dynamic channel tables 325, although in other embodiments any appropriate channel table may be created. Control then continues to block 520 where the channel manager 310 initializes the message-passing adapter 120, hardware, and associated channels. Control then continues to block 599 where the function returns.

Figure 6:
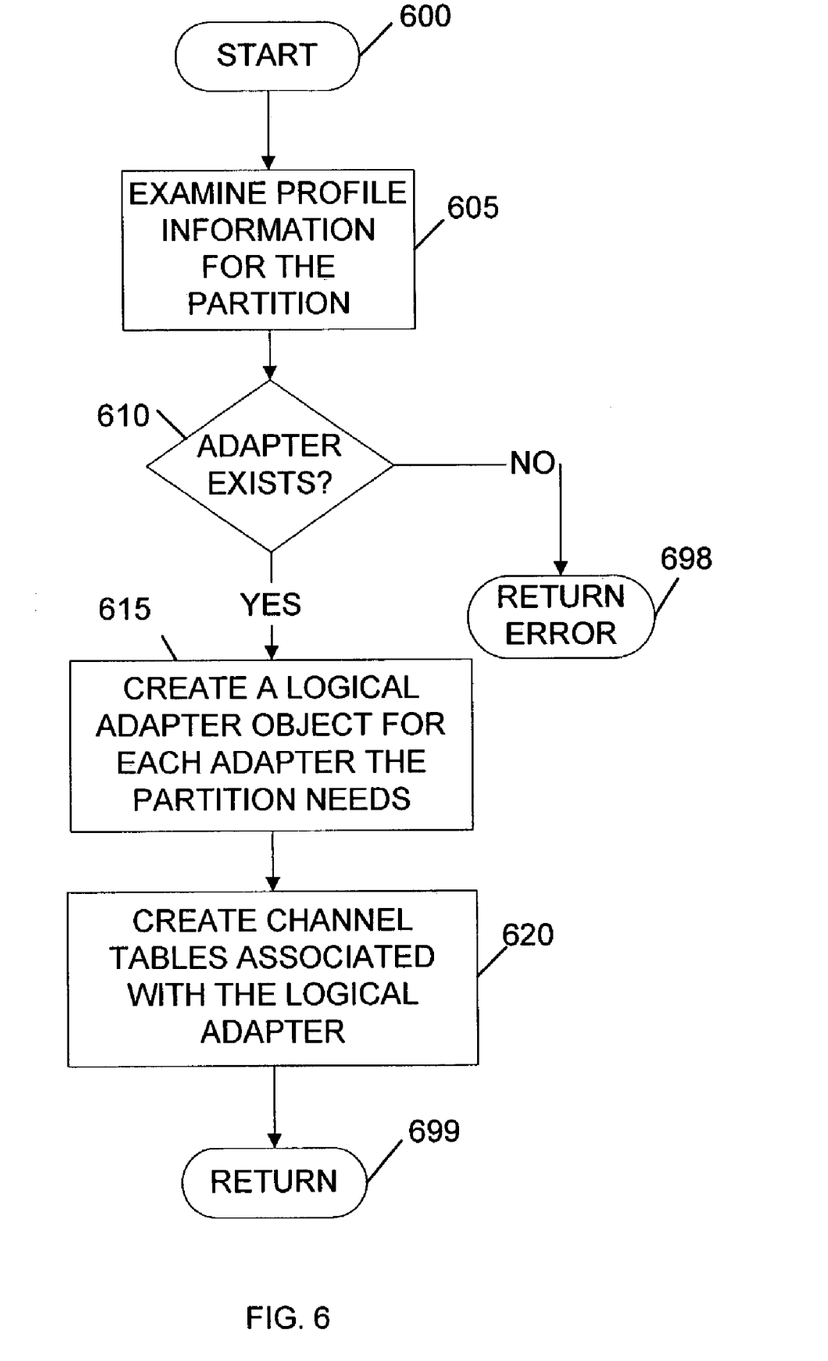
FIG. 6 depicts a flowchart of example processing for a channel manager function to allocate logical adapter objects for a partition, according to an embodiment of the invention.

FIG. 6 depicts a flowchart of example processing for a function in the channel manager 310 to dynamically allocate logical-partition adapter objects on demand for a partition, according to an embodiment of the invention. Control begins at block 600. Control then continues to block 605 where the channel manager 310 examines profile information for the partition that initiated the allocate command. Control then continues to block 610 where the channel manager 310 determines whether the adapter 315 exists. If the determination at block 610 is false, then control continues to block 698 where an error is returned since in an embodiment an adapter needs to be initialized prior to allocating logical-partition adapter objects.

If the determination at block 610 is true, then control continues to block 615 where the channel manager 310 creates a logical-partition adapter object 335 for each message-passing adapter 120 that the partition needs. Control then continues to block 620 where the channel manager 310 creates channel tables associated with each logical-partition adapter object 335, such as the static channel table 345. Control then continues to block 699 where the function returns.

Figure 7:
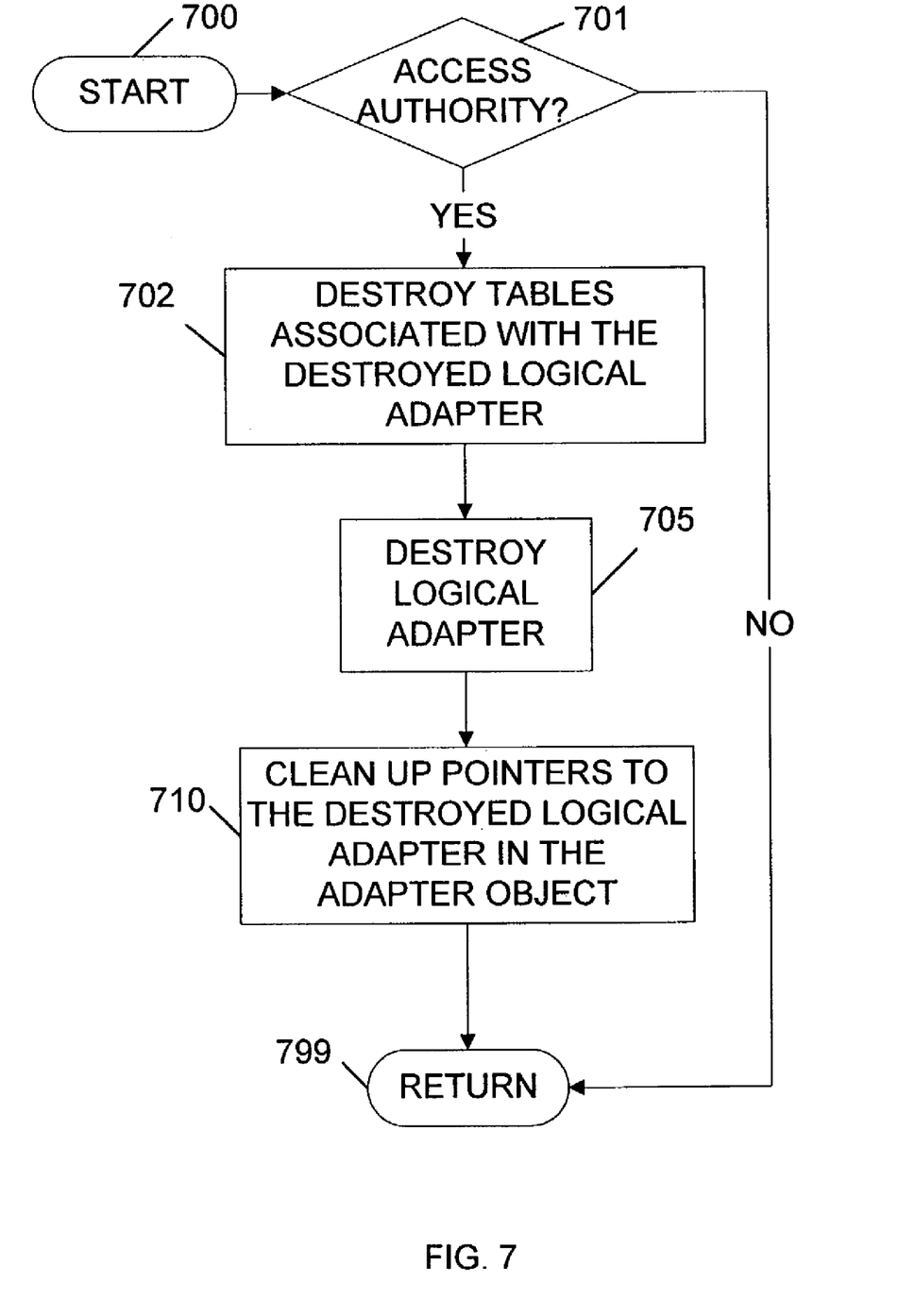
FIG. 7 depicts a flowchart of example processing for a channel manager function to deallocate a logical adapter object, according to an embodiment of the invention.

FIG. 7 depicts a flowchart of example processing for a function in the channel manager 310 to deallocate a logical-partition adapter object when it is no longer needed by a partition, according to an embodiment of the invention. Control begins at block 700. Control then continues to block 701 where the channel manager 310 determines whether the invoking partition has access authority to the logical-partition adapter object 335. If the determination at block 701 is false, then control continues to block 799 where the function returns.

If the determination at block 701 is true, then control continues to block 702 where the channel manager 310 destroys the tables associated with the logical-partition adapter object 335, such as the static channel tables 345. Control then continues to block 705 where the channel manager 310 destroys the logical-partition adapter object 335. Control then continues to block 710 where the channel manager 310 cleans up pointers in the adapter object 315 to the destroyed logical-partition adapter object 335. Control then continues to block 799 where the function returns.

Figure 8:
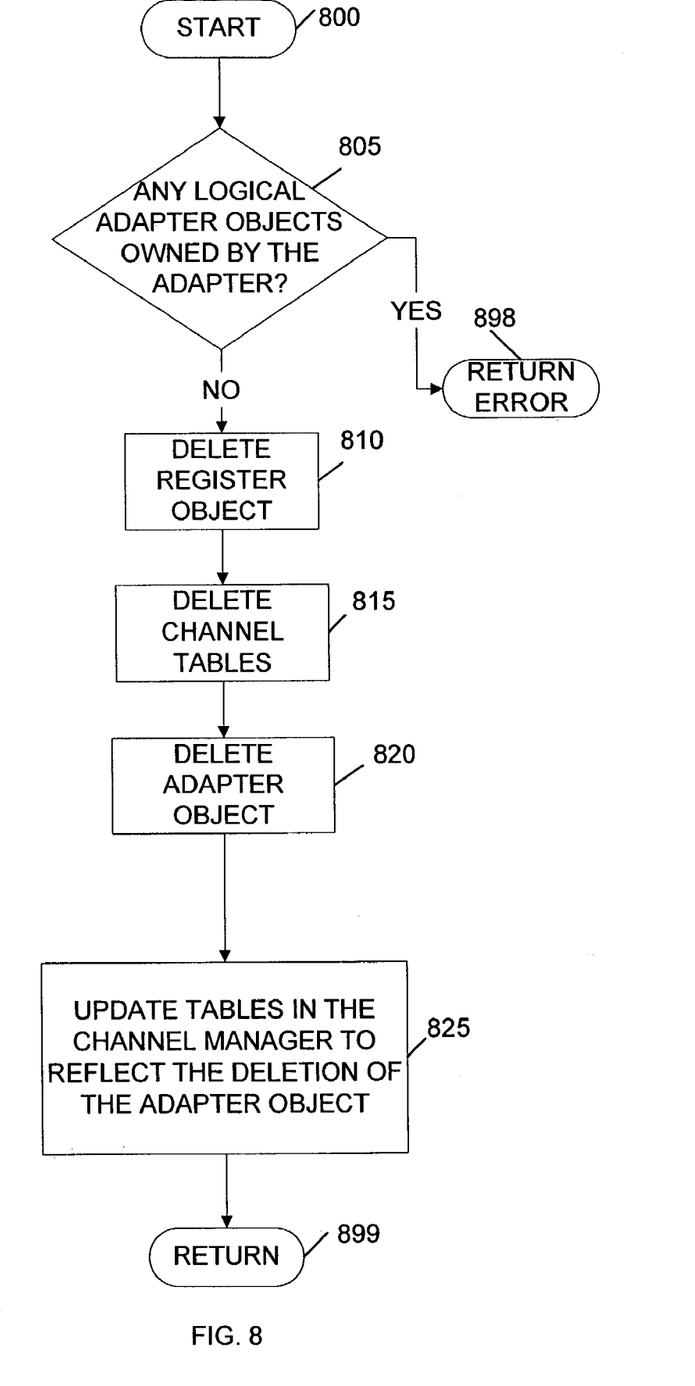
FIG. 8 depicts a flowchart of example processing for a channel manager function to uninitialize an adapter, according to an embodiment of the invention.

FIG. 8 depicts a flowchart of example processing for function in the channel manager 310 to uninitialize the adapter 315, according to an embodiment of the invention. Control begins at block 800 where the channel manager 310 receives an identification of the adapter object that the partition wishes to uninitialize. Control then continues to block 805 where the channel manager 310 determines whether any logical-partition adapter objects 335 are still owned by the adapter object 315. If the determination at block 805 is true, then control continues to block 898 where the function returns an error to the partition that initiated the uninitialize command since, in an embodiment, an adapter object may not be uninitialized until all of its associated logical-partition adapter objects have been destroyed.

If the determination at block 805 is false, then control continues to block 810 where the channel manager 310 deletes the register object 320. Control then continues to block 815 where the channel manager 310 deletes the channel tables associated with the adapter object 315, such as the dynamic channel table 325. Control then continues to block 820 where the channel manager 310 deletes the adapter object 315. Control then continues to block 825 where the channel manager 310 updates tables in the channel manager 310 to reflect that the adapter object 315 no longer exists. Control then continues to block 899 where the function returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    creating an adapter data structure associated with an adapter;
    creating a plurality of partition adapter data structures associated with the adapter data structure and associated with a respective plurality of partitions in a logically-partitioned electronic device; and
    creating a plurality of channel tables associated with the adapter data structure.

2. The method of claim 1, further comprising:
    creating a register data structure associated with the adapter data structure,
    wherein the register data structure comprises a state of the adapter.

3. The method of claim 1, wherein at least one of the plurality of channel tables comprises a dynamic channel table.

4. The method of claim 1, further comprising:
    receiving a message for one of the plurality of partitions via a channel controlled by an associated one of the plurality of partition adapter data structures.

5. An apparatus comprising:
means for creating an adapter data structure associated with an adapter;
means for creating a plurality of partition adapter data structures associated with the adapter data structure and associated with a respective plurality of logical partitions in a logically-partitioned electronic device; and
means for creating a plurality of channel tables associated with the adapter data structure.

6. The apparatus of claim 5, further comprising:
means for deleting one of the plurality of partition adapter data structures if an associated one of the plurality of logical partitions no longer needs access to the adapter.

7. The apparatus of claim 5, further comprising:
means for sending a message from one of the plurality of logical partitions via a channel controlled by an associated one of the plurality of partition adapter data structures.

8. A recordable medium encoded with instructions, wherein the instructions when executed comprise:
creating an adapter data structure associated with an adapter;
creating a plurality of partition adapter data structures associated with the adapter data structure and associated with a respective plurality of partitions in a logically-partitioned electronic device; and
creating a plurality of channel tables associated with the adapter data structure.

9. The recordable medium of claim 8, further comprising:
creating a register data structure associated with the adapter data structure,
wherein the register data structure comprises a state of the adapter.

10. The recordable medium of claim 8, wherein at least one of the plurality of channel tables comprises a dynamic channel table.

11. The recordable medium of claim 8, further comprising:
receiving a message for one of the plurality of partitions via a channel controlled by an associated one of the plurality of partition adapter data structures.

12. A recordable medium encoded with a data structure accessed by a channel manager that is to be executed by a processor, wherein the data structure comprises:
an adapter object associated with an adapter;
a plurality of partition adapter objects associated with the adapter object and associated with a respective plurality of partitions in a logically-partitioned electronic device, wherein the channel manager dynamically creates the plurality of partition adapter objects on demand for the respective plurality of partitions; and
a plurality of channel tables associated with the adapter object.

13. The recordable medium of claim 12, wherein the channel manager deletes the plurality of partition adapter objects when no longer needed by the respective plurality of partitions.

14. The recordable medium of claim 12, wherein the plurality of partitions access the adapter via the respective plurality of partition adapter objects.

15. The recordable medium of claim 12, wherein the data structure further comprises:
a plurality of static channel tables associated with the respective plurality of partition adapter objects.

16. An electronic device comprising:
a processor; and
a storage device encoded with instructions, wherein the instructions when executed by the processor comprise:
creating an adapter data structure associated with a message-passing adapter,
dynamically creating a plurality of partition adapter data structures on demand for a plurality of respective partitions in a logically-partitioned electronic device, wherein the plurality of partitions send and receive messages via the respective plurality of partition adapter data structures, and wherein the plurality of partition adapter data structures are further associated with the adapter data structure, and
creating a plurality of channel tables associated with the adapter data structure.

17. The electronic device of claim 16, wherein the instructions further comprise:
creating a register data structure associated with the adapter data structure, wherein the register data structure comprises a state of the adapter.

18. The electronic device of claim 16, wherein at least one of the plurality of channel tables comprises a dynamic channel table.

19. The electronic device of claim 16, wherein the instructions further comprise:
deleting one of the plurality of partition adapter data structures if an associated one of the plurality of partitions no longer needs access to the message-passing adapter.

* * * * *